DEFENSIVE PUBLICATION

UNITED STATES PATENT OFFICE

Published at the request of the applicant or owner in accordance with the Notice of Dec. 16. 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1149

T878,020

PHOTOGRAPHIC PHYSICAL DEVELOPMENT UTILIZING A SILVER-ORGANIC COMPLEX

Frederick J. Rauner, Kodak Park Division, Rochester, N.Y. 14650

Filed Feb. 10, 1970, Ser. No. 10,295
Int. Cl. G03c *5/26*
U.S. Cl. 96—50
No Drawing. 21 Pages Specification

A stable source of silver for photographic physical development is (a) a silver-organic complex of silver with a polymeric reaction product of an aldehyde with a hydroxy aromatic carboxylic acid and/or (b) a silver-organic complex of silver with a monomeric hydroxy aromatic carboxylic acid. Photographic elements, compositions and processes which can contain and/or employ these sources of silver for photographic physical development include those which are suitable for so-called dry processing. They can, for example, be used in photographic systems employing a silver dye complex as a photographic component or in photographic systems employing an oxidation-reduction reaction to provide a developed image. A silver-organic complex of silver with, for example, (i) a polymeric reaction product of formaldehyde with salicylic acid, (ii) salicylic acid, (iii) 5,5′-methylenedisalicylic acid, (iv) 5-bromosalicylic acid, (v) 5-sulfosalicylic acid, (vi) 5,5′-thiodisalicylic acid and/or (vii) 3,5-dihydroxy benzoic acid is especially useful as a source of silver for physical development.